United States Patent
Tian et al.

(10) Patent No.: US 11,985,548 B2
(45) Date of Patent: May 14, 2024

(54) RANDOM ACCESS CHANNEL STRUCTURE DESIGN

(71) Applicant: ZTE Corporation, Guangdong (CN)

(72) Inventors: Li Tian, Guangdong (CN); Ziyang Li, Guangdong (CN); Wei Cao, Guangdong (CN); Junfeng Zhang, Guangdong (CN); Jianqiang Dai, Guangdong (CN)

(73) Assignee: ZTE Corporation, Shenzhen (CN)

( * ) Notice: Subject to any disclaimer, the term of this patent is extended or adjusted under 35 U.S.C. 154(b) by 340 days.

(21) Appl. No.: 17/387,552

(22) Filed: Jul. 28, 2021

(65) Prior Publication Data

US 2021/0360485 A1 Nov. 18, 2021

Related U.S. Application Data

(63) Continuation of application No. PCT/CN2019/073648, filed on Jan. 29, 2019.

(51) Int. Cl.
*H04W 28/26* (2009.01)
*H04W 48/16* (2009.01)
*H04W 72/0446* (2023.01)

(52) U.S. Cl.
CPC ........... *H04W 28/26* (2013.01); *H04W 48/16* (2013.01); *H04W 72/0446* (2013.01)

(58) Field of Classification Search
None
See application file for complete search history.

(56) References Cited

U.S. PATENT DOCUMENTS

| 10,142,980 B2 | 11/2018 | Radulescu et al. |
| 2015/0289292 A1* | 10/2015 | Sun ........................ H04L 5/0092 370/329 |
| 2018/0279375 A1 | 9/2018 | Jeon et al. |
| 2019/0104551 A1* | 4/2019 | Deenoo ............. H04W 72/0453 |

(Continued)

FOREIGN PATENT DOCUMENTS

| CN | 102143533 A | 8/2011 |
| CN | 108702645 A | 10/2018 |

(Continued)

OTHER PUBLICATIONS

Mediatek Inc., "On 2-step random access procedure and physical channel in NR," 3GPP TSG RAN WG1 Meeting #87, R1-1700172, Spokane, USA, Jan. 16-20, 2017, 7 pages.

(Continued)

*Primary Examiner* — Anh Ngoc M Nguyen
(74) *Attorney, Agent, or Firm* — Perkins Coie LLP

(57) ABSTRACT

Techniques are described to configure a channel structure for a random-access procedure. For example, a wireless communication method includes communicates, by a first device, a channel structure to a second device, where the channel structure includes a first set of resources reserved for a first message (e.g., a preamble), a second set of resources reserved for a second message (e.g., a payload), or a time duration gap between the first set of resources and the second set of resources. The wireless communication method also includes receiving by the first device the first message and the second message at the configured first and second set of resources, respectively.

20 Claims, 11 Drawing Sheets

(56) References Cited

U.S. PATENT DOCUMENTS

| | | | |
|---|---|---|---|
| 2020/0305200 A1 | 9/2020 | Jiang | |
| 2021/0274567 A1* | 9/2021 | Takeda | ............. H04W 74/0841 |

FOREIGN PATENT DOCUMENTS

| | | | |
|---|---|---|---|
| WO | 2018064367 A1 | 4/2018 |
| WO | 2018127487 A1 | 7/2018 |
| WO | 2018/171194 A1 | 9/2018 |
| WO | 2018175809 A1 | 9/2018 |
| WO | 2018232090 A1 | 12/2018 |
| WO | 2020154169 A1 | 7/2020 |

OTHER PUBLICATIONS

International Search Report and Written Opinion dated Oct. 30, 2019 for International Application No. PCT/CN2019/073648, filed on Jan. 29, 2019 (6 pages).

ZTE Corporation et al., "On 2-step RACH procedure in NR," 3GPP TSG RAN WG1 Meeting #87, Reno, U.S.A., R1-1611274, 4 pages, Nov. 14-18, 2016.

ZTE et al., "2-step random Access Procedure," 3GPP TSG RAN WG1 AH_NR Meeting, Spokane, U.S.A., R1-1700105, 9 pages, Jan. 16-20.

European Search Report for EP Patent Application No. 19913023.8, dated Jan. 21, 2022, 11 pages.

Institute for Information Industry (III), et al., "Dynamic Separate RACH resources for MTC," 3GPP TSG RAN WG2 #74, R2-113328, May 9-13, 2011, Barcelona, Spain, 5 pages.

Qualcomm Incorporated, "Report of Email Discussion [103#55][NR-U] 2-step RACH Model and Initial Informatio Contents (Qualcomm)," 3GPP TSG-RAN WG2 Meeting #103bis, R2-1815564, Chengdu, China, Oct. 8-12, 2018, 17 pages.

Co-Pending Chinese Application No. 201980090316.5, Chinese Notification to Complete Formalities of Registration dated Nov. 4, 2022, 4 pages with unofficial translation.

European Communication pursuant to Article 94(3) EPC issued in EP Patent Application No. 19913023.8, dated Sep. 18, 2023, 5 pages.

* cited by examiner

RANDOM ACCESS CHANNEL STRUCTURE DESIGN

CROSS-REFERENCE TO RELATED APPLICATIONS

This application is a continuation of International Patent Application No. PCT/CN2019/073648, filed on Jan. 29, 2019, the contents of which are incorporated herein by reference in their entirety.

TECHNICAL FIELD

This disclosure is directed generally to wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Techniques are disclosed for a designing a channel structure for wireless transmission. The channel structure may include a first message (e.g., a preamble) which is used by a network node to detect a communication node, and a second message (e.g., payload) to carry data. Resources for the first message and the second message can be pre-configured and reserved. A time duration gap between the first message and second message can be explicitly or implicitly configured by a network node.

In some embodiments, if the network node detects an absence of the first message, the reserved resources for the second message can be released by the network node. In some embodiments, the network node can estimate the timing offset and/or path loss based on the first message and feedback a message within the time duration gap indicating a timing advance value and/or power control value to a communication node, so that the communication node can adjust the timing and/or power used to transmit the second message. In some embodiments, the network node can schedule a new set of resources for transmitting the second message within the time duration gap, so that the communication node can use the newly allocated resources rather than the reserved one to transmit the second message.

An exemplary wireless communication method includes communicating, by a first device, a channel structure to a second device, and receiving, by the first device, the first message and the second message at the configured first and second set of resources, respectively. The channel structure includes a first set of resources reserved for a first message, a second set of resources reserved for a second message, or a time duration gap between the first set of resources and the second set of resources.

In some embodiments, the time duration gap is determined by the first device and where the time duration gap is communicated to the second device via a broadcast message, radio resource control (RRC) message or downlink control information (DCI) message. In some embodiments, the time duration gap is calculated by the first device based on the configured first and second set of resources.

In some embodiments, the time duration gap is determined by or is calculated by the first device based on a difference in time domain between a first symbol of the first message and a first symbol of the second message. In some embodiments, the time duration gap is determined by or is calculated by the first device based on a difference in time domain between a last symbol of the first message and a first symbol of the second message. In some embodiments, the time duration gap is determined by or is calculated by the first device based on a difference in time domain between a first symbol of the first message and a last symbol of the second message. In some embodiments, the time duration gap is determined by or is calculated by the first device based on a difference in time domain between a last symbol of the first message and a last symbol of the second message.

In some embodiments, the first device releases the second set of resources for the second message in response to determining an absence of a reception of the first message at the first set of resources. In some embodiments, the first message is selected from a number of sequences for the second device, and the first device releases the second set of resources for the second message in response to determining an absence of a reception of one or more of the number of sequences at the first set of resources. In some embodiments, the second message is comprised of a first part and a second part, where a subset of the second set of resources reserved for the first part of the second message are adjacent to the first set of resources reserved for the first message, and where the first device releases the second set of resources for the second message in response to determining an absence of a reception of the first message at the first set of resources and the first part of the second message at the subset of the second set of resources.

In some embodiments, the first device estimates a time offset for reception of the second message, where the time offset is based on the received first message, and transmits, within the time duration gap, a message to the second device, where the message indicates a timing advance value indicative of the timing offset, where the second message is received based on the timing advance value.

In some embodiments, the first device transmits within the time duration gap a message to the second device, where the message indicates a power control value indicative of the power offset. In some embodiments, the first device transmits within the time duration gap a message to the second device, where the message indicates an allocated resource for the second message, where the second message is received based on the allocated resource.

In some embodiments, the first message includes preamble information to identify the second device, and the second message includes payload data. In some embodiments, the first device includes a base station and the second device includes a user equipment.

Another exemplary wireless communication method comprises receiving, by a second device, a channel structure from a first device, and transmitting, by the second device, the first message and the second message at the configured first and second set of resources, respectively. The channel structure includes a first set of resources reserved for a first message, a second set of resources reserved for a second message, or a time duration gap between the first set of resources and the second set of resources. At the transmitting operation, In some embodiments, the time duration gap is determined by the first device and where the time duration gap is received by the second device via a broadcast message, a radio resource control (RRC) message or downlink control information (DCI) message. In some embodiments, the time duration gap is calculated based on the configured first and second set of resources.

In some embodiments, the time duration gap is calculated by the second device based on a difference in time domain between a first symbol of the first message and a first symbol of the second message. In some embodiments, the time duration gap is calculated by the second device based on a difference in time domain between a last symbol of the first message and a first symbol of the second message. In some embodiments, the time duration gap is calculated by the second device based on a difference in time domain between a first symbol of the first message and a last symbol of the second message. In some embodiments, the time duration gap is calculated by the second device based on a difference in time domain between a last symbol of the first message and a last symbol of the second message.

In some embodiments, the second device receives from the first device a message within the time duration gap, where the message indicates a timing advance value indicative of a timing offset, where the second device adjusts a timing for transmitting the second message based on the timing advance value. In some embodiments, the second device receives from the first device a message within the time duration gap, where the message indicates a power control value indicative of a power offset, where the second device adjusts a transmission power for transmitting the second message based on the power control value.

In some embodiments, the second device receives from the first device a message by within the time duration gap, where the message indicates an allocated resource for the second message, where the second device transmit the second message on the allocated resource.

In some embodiments, the first message includes preamble information to identify the second device, and the second message includes payload data. In some embodiments, the first device includes a base station and the second device includes a user equipment.

In yet another exemplary aspect, the above-described method is embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

The 2-step random access channel (RACH) has been proposed in 3GPP to simplify the random access processing, save signaling overhead and reduce power consumption. In 2-step RACH, msgA for the first step contains a preamble and payload corresponding to the msg1 and msg3 respectively in the original 4-step RACH. Since there is no information interaction between base station and user equipment (UE) before sending msgA, the physical resources for preamble (PRACH) and payload (PUSCH) should be reserved, i.e., pre-configured semi-statically. The problem is that when the traffic load is not very heavy, the reserved resources may be wasted, especially those PUSCH resources reserved for transmitting the payload part. The techniques described in this patent document introducing a new channel structure for msgA. In some embodiments, the same channel structure can be also used for uplink data transmission other than random access, where the content of the payload is not limited to that in msg3.

Figure 1A:
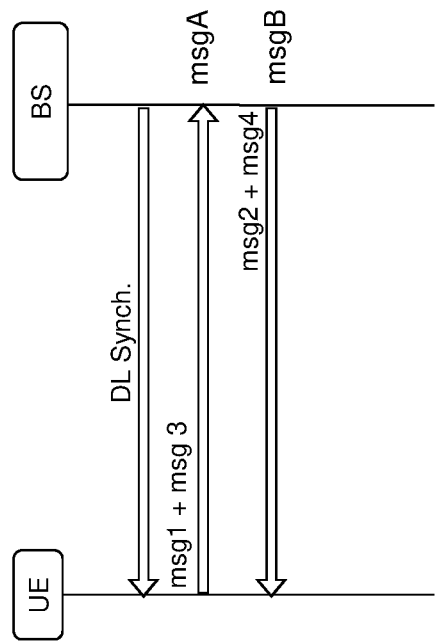
FIGS. 1A and 1B show a 4-step RACH procedure and a 2-step RACH procedure, respectively.
Figure 1B:
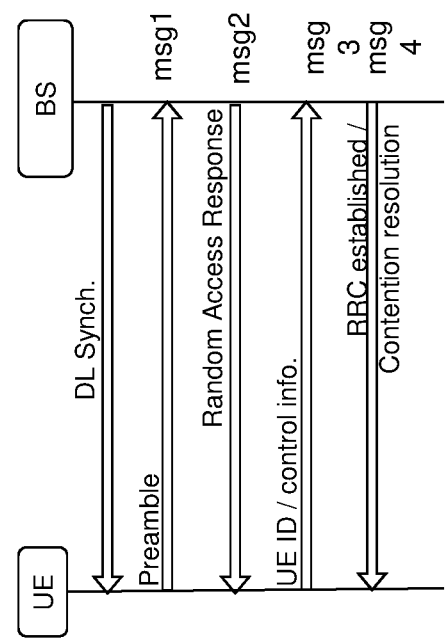

FIGS. 1A and 1B show a 4-step RACH procedure and a 2-step RACH procedure, respectively. The 2-step RACH can be regarded as a simplified RACH process, where in the first step msgA contains the msg1 (preamble carried on PRACH) and msg3 (can be regarded as payload carried on PUSCH) in 4-step RACH, and in the second step msgB contains the msg2 and msg4 in 4-step RACH. So, in the 2-step RACH procedure there is only one interaction between a base station (BS) and UE before the establishment of radio resource control (RRC) connection.

Figure 2:
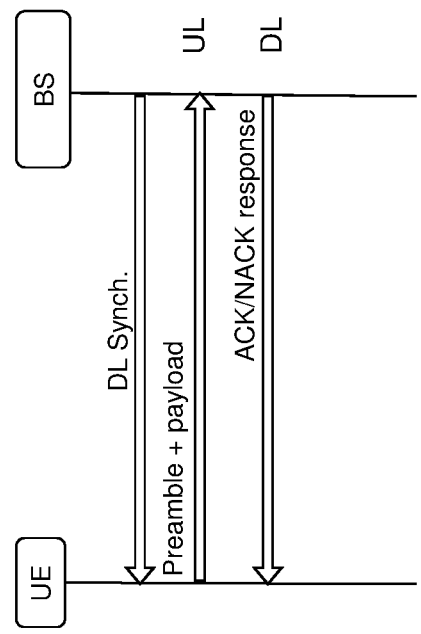
FIG. 2 shows uplink grant-free data transmission procedures.

The same channel structure of "preamble+payload" can be also used for grant-free uplink data transmission. FIG. 2 shows uplink grant-free data transmission procedures. Other than RACH which only carries control plane data, the content of the payload for uplink data transmission can include some user plane data. And it is not necessary to establish RRC connection if the data is successfully decoded.

An issue for 2-step RACH from physical layer perspective, is to design the channel structure of "msgA". As mentioned above, msgA includes two parts: preamble and payload. The preamble format can reuse that defined for 4-step RACH, as can be found in [T538.211, chapter 6.3.3]. Multiple configurations are defined in the specification, and for each configuration, the resources for PRACH (RACH occasions) are preconfigured periodically [T538.211, table 6.3.3.2-2 to 6.3.3.2-4].

Similarly, the resource for PUSCH transmitting the payload in msgA can be also periodically preconfigured. A mapping rule between RACH occasion for preamble and PUSCH resource for payload can be pre-defined, or the resources of payload are independently configured which include: 1) the location of payload transmission resource in time domain; 2) the duration of payload transmission; 3) the location of payload transmission resource in frequency domain; or 4) the bandwidth of payload transmission.

The example headings for the various sections below are used to facilitate the understanding of the disclosed subject matter and do not limit the scope of the claimed subject matter in any way. Accordingly, one or more features of one example section can be combined with one or more features of another example section. Furthermore, 5G terminology is used for the sake of clarity of explanation, but the techniques disclosed in the present document are not limited to 5G technology only, and may be used in wireless systems that implemented other protocols.

I. Exemplary Channel Structure

Figure 3:
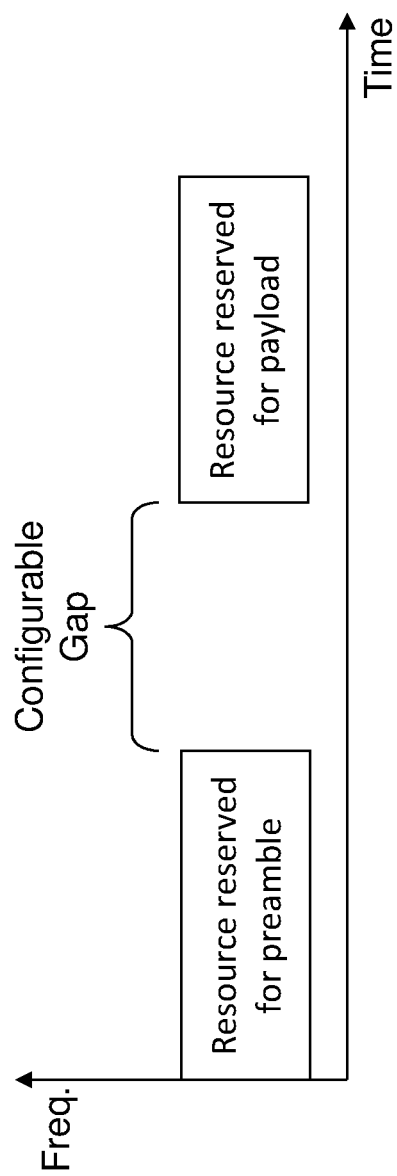
FIG. 3 shows the time domain association between the resources for preamble and payload.

In an exemplary embodiment, a channel structure is described for the uplink transmission in the form of "preamble+gap+payload." FIG. 3 shows the time domain association between the resources for preamble and payload. Firstly, the resources for the preamble transmission can be pre-configured or predetermined by the BS, and a time duration gap can be semi-statically or dynamically configured by the BS to indicate to the UE the time domain location of the PUSCH resources for the payload. In some embodiments, the BS determines the time duration gap and the BS communicates the time duration gap to the UE via a broadcast message, RRC message, or downlink control information (DCI) message.

Both the BS and the UE can determine the time duration gap. The BS and the UE can determine the time duration gap based on a set of resources configured for the preamble message and based on another set of resources configured for the payload message. For example, the configurable gap can be determined by the BS and UE using any one of the following: (1) from the first symbol of preamble to the first symbol of payload; (2) from the last symbol of preamble to the first symbol of payload; (3) from the first symbol of preamble to the last symbol of payload; or (4) from the last symbol of preamble to the last symbol of payload.

The gap may be also implicitly configured, e.g., if the resource for the payload is pre-configured independently from the resource for the associated preamble, the configurable gap can be calculated according any one of four calculation schemes described above. The gap can be flexibly configured based on the system requirement, traffic load, and the preamble detection. A small gap is beneficial for the low latency uplink data transmission, while large gap is beneficial for enhancing the resource utilization. For example, if BS found that no UEs are performing RACH in the specific resources based on the preamble detection, then the reserved PUSCH resources can be scheduled for other purposes.

II. Exemplary Embodiment 1—Preamble+Gap+Payload

Figure 4:
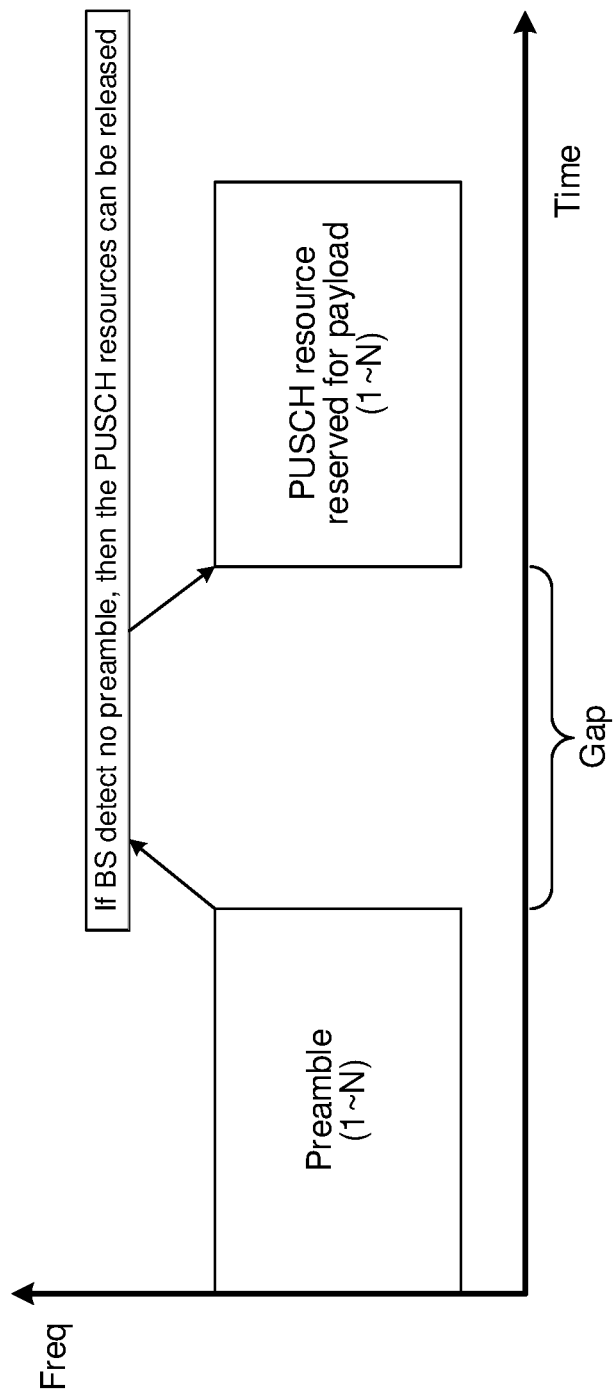
FIG. 4 shows an example scenario where a network node releases a set of resources for a payload if the network node determines an absence of a preamble.

Assuming there are N preamble sequences for UEs to randomly choose where the N preamble sequences are multiplexed on the same physical resources, and all the preamble sequences are associated to a same PUSCH resource block which is preconfigured and reserved. A gap can be configured by the BS so that within the gap the BS can try to blind detect the preamble sequences. As shown in FIG. 4, if no preamble is detected by the BS, which can mean that no UEs are performing data transmission by using the pre-configured resources, the PUSCH resources for payload transmission can be released by the BS, e.g., the BS can schedule other grant-based services on those PUSCH resources.

III. Exemplary Embodiment 2—Preamble+Gap+Multiple Payload

Figure 5:
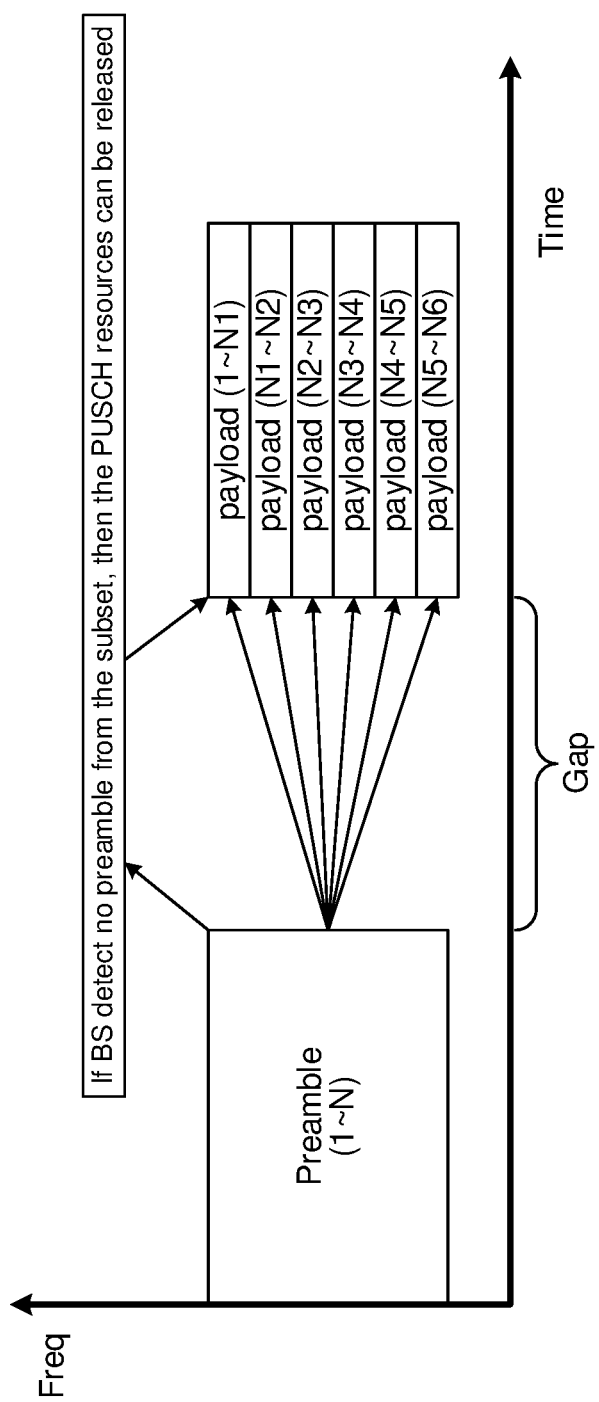
FIG. 5 shows an example scenario where a network node releases a set of resources for a payload if the network node determines an absence of a subset of preamble sequences.

Assuming there are N preamble sequences for UEs to randomly choose, where the N preamble sequences are multiplexed on the same physical resources, and each subset of the N preamble sequences are associated to a PUSCH resource block which is preconfigured and reserved. A gap can be configured that within the gap the BS can try to blind detect the preamble sequences for each subset. As shown in FIG. 5, if no preamble in a subset is detected, the corresponding PUSCH resource block for payload transmission can be released, e.g., BS can schedule other grant-based services on those PUSCH resources. The multiple payload may be assigned a set of resource on different frequencies (as shown in FIG. 5), or the multiple payload may be assigned a set of resources on different time value.

IV. Exemplary Embodiment 3—Preamble with Payload1+Gap+Payload2

Figure 6:
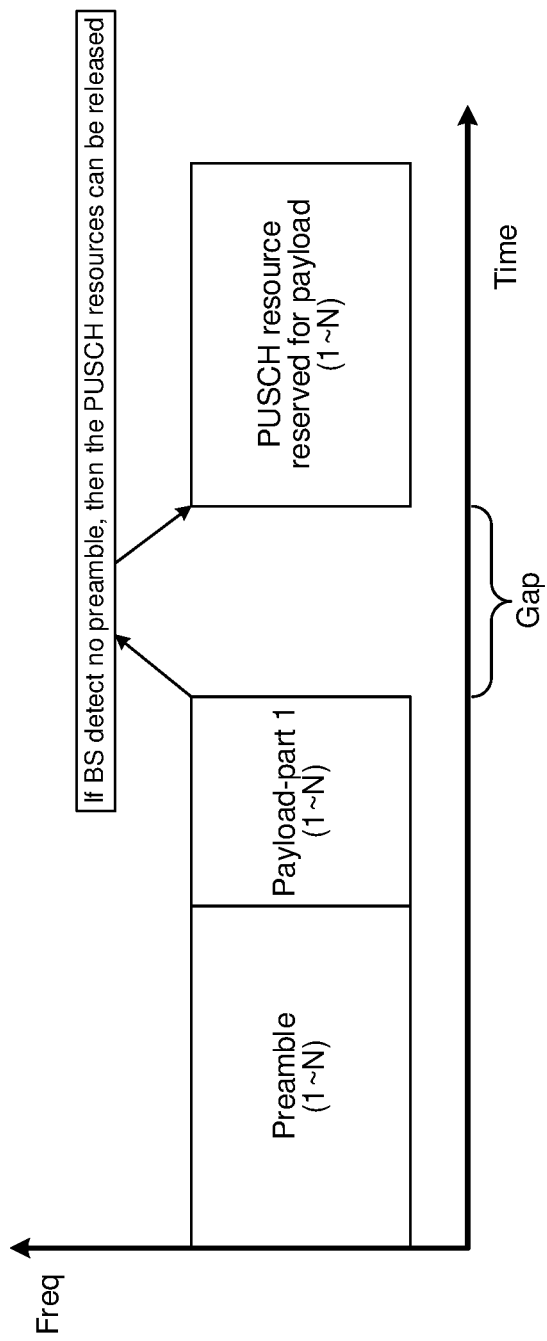
FIG. 6 shows an example scenario where a network node releases a set of resources for a part of a payload if the network node determines an absence of a preamble and another part of the payload.

Exemplary embodiment 3 may be considered similar to exemplary embodiment 1, but in this embodiment the payload can be split into two parts. Part 1 of the payload may contain some latency sensitive messages and transmitted in conjunction with preamble, and part 2 of the payload may contain the rest of the message(s). Part 1 and part 2 of the payload may be assigned a set of resources, where a subset of the set of resources reserved for part 1 of the payload can be adjacent to a set of resources used for the preamble message. As shown in FIG. 6, if no preamble is detected or if part 1 of payload is not detected (i.e., if no UE is detected based on part 1 of payload), the corresponding PUSCH resources for payload part 2 can be released.

Figure 7:
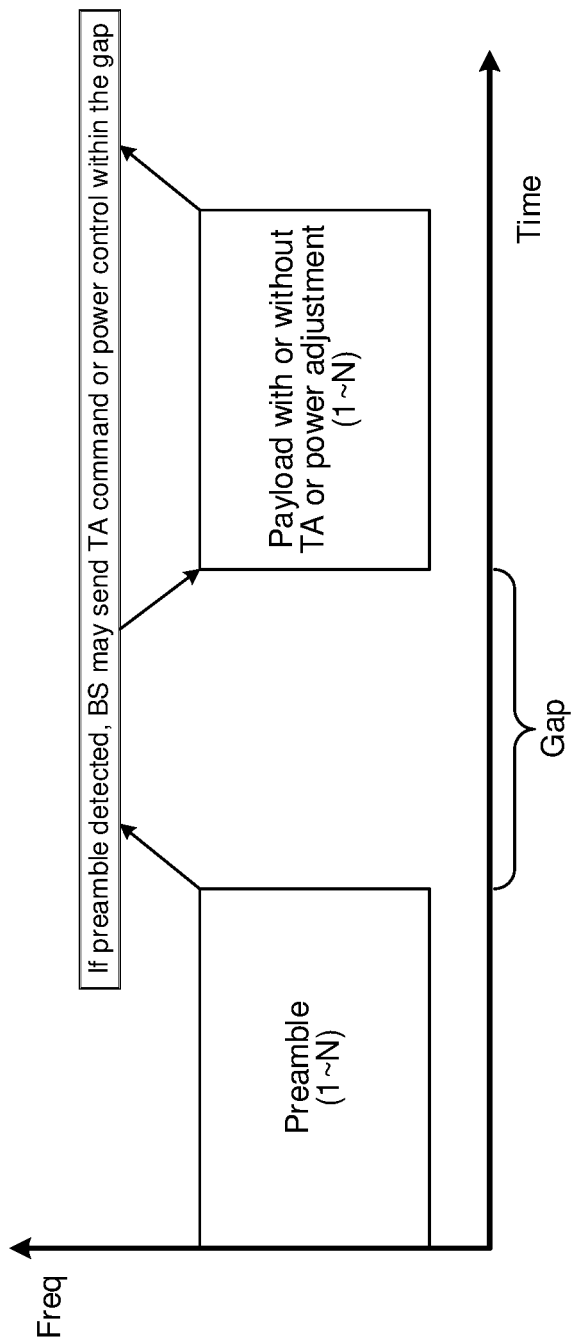
FIG. 7 shows an example scenario where a communication node monitors downlink information during the time duration gap to adjust the timing and/or power for the payload transmission.

V. Exemplary Embodiment 4—Preamble+Gap with TA Feedback and/or Power Control+Payload If a preamble sequence is detected, BS can estimate the timing offset and/or path loss for the UE sending the preamble sequence. Next, the BS can decide whether to send timing advance (TA) command and/or power control command within the time duration gap, if there are downlink resources available. The TA command and the power control command can indicate a timing advance value and the power control value, respectively. As shown in FIG. 7, the UE can monitor the downlink information and then adjust the timing and/or power for the payload transmission based the received TA value or power control value. This can be similar to the msg2 in 4-step RACH, but there is no need to include the grant information for msg3, since the resource for payload is pre-allocated.

VI. Exemplary Embodiment 5—Preamble+Gap with UL Grant+Payload

Figure 8:
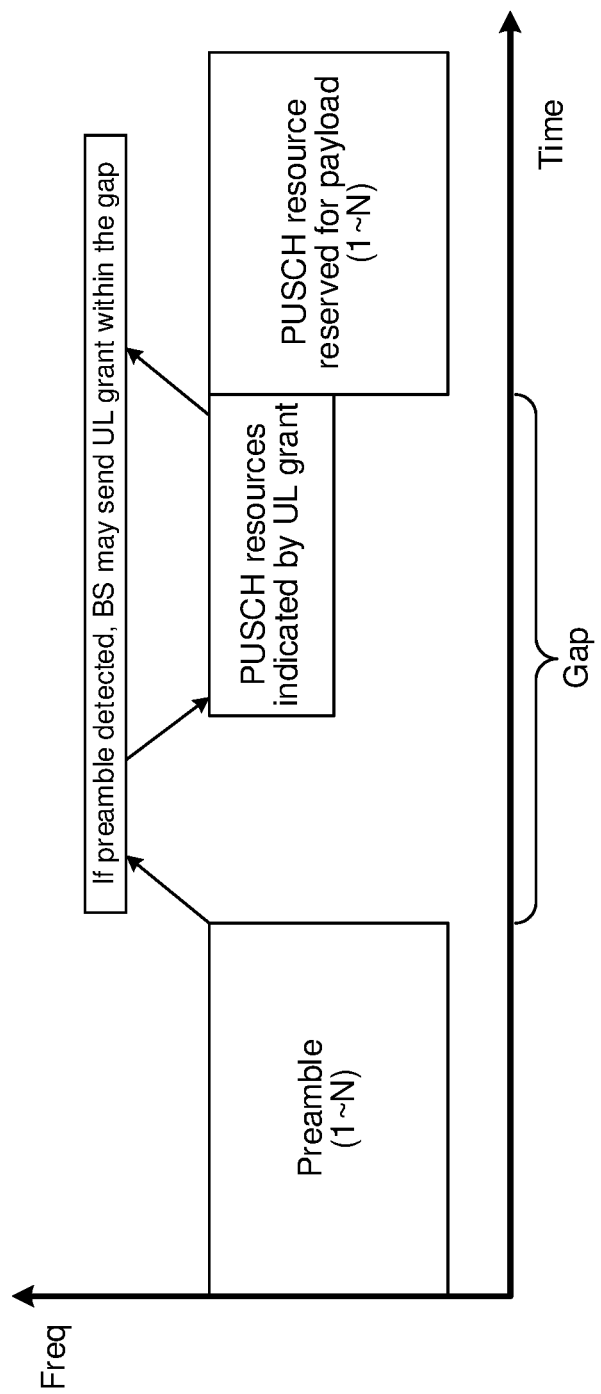
FIG. 8 shows an example scenario where a communication node can use newly allocated resources by the network node rather than the reserved one to transmit the payload.

As shown in FIG. 8, if a preamble sequence is detected by the BS, the BS can decide whether to send UL grant within the time duration gap, if there are downlink and uplink resources available. UE can monitor the downlink information and then use the newly allocated resources by the BS rather than the reserved one, for the payload transmission. Exemplary embodiment 5 beneficially implies a fall back mechanism from 2-step RACH to 4-step RACH. TA and power control as indicated in exemplary embodiment 4 can be included in the UL grant.

VII. Exemplary Embodiment 6—Implicit Indication of Gap Between the Preamble and Associated Payload The preamble resources in time and frequency domain are also called RACH occasion. The preamble and PUSCH resource for payload in msgA can be individually configured by the network (e.g., the BS). UE determines the payload transmission resources based on the preamble and the association rule or mapping rule between the preamble and associated payload. For example, the network can determine the mapping rule between the preamble index or time resource or frequency resource and the payload time resource or frequency or code domain resource. The code resources of payload can mean that different payloads can be distinguished by different code, e.g. payload demodulation reference signal (DMRS) index. The gap mention in above embodiments can be implicitly indicated by the mapping rule and UE can calculate the gap according to the mapping rule between the preamble and associated payload.

Figure 9:
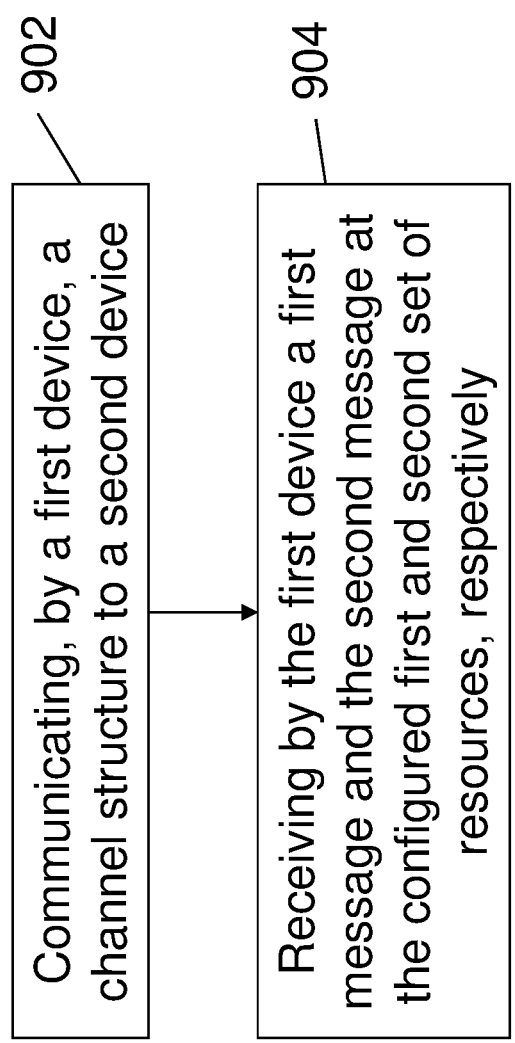
FIG. 9 shows an exemplary flowchart for a network node to communicate a channel structure to a communication node.

FIG. 9 shows an exemplary flowchart for a network node to communicate a channel structure to a communication node. At the communicating operation 902, a first device communicates a channel structure to a second device, where the channel structure includes a first set of resources reserved for a first message, a second set of resources reserved for a second message, or a time duration gap between the first set of resources and the second set of resources.

At the receiving operation 904, the first device receives from the second device the first message and the second message at the configured first and second set of resources, respectively.

In some embodiments, the time duration gap is determined by the first device and where the time duration gap is communicated to the second device via a broadcast message, radio resource control (RRC) message or downlink control information (DCI) message. In some embodiments, the time duration gap is calculated by the first device based on the configured first and second set of resources.

In some embodiments, the time duration gap is determined by or is calculated by the first device based on a difference in time domain between a first symbol of the first message and a first symbol of the second message. In some embodiments, the time duration gap is determined by or is calculated by the first device based on a difference in time domain between a last symbol of the first message and a first symbol of the second message. In some embodiments, the time duration gap is determined by or is calculated by the first device based on a difference in time domain between a first symbol of the first message and a last symbol of the second message. In some embodiments, the time duration gap is determined by or is calculated by the first device based on a difference in time domain between a last symbol of the first message and a last symbol of the second message.

In some embodiments, the first device releases the second set of resources for the second message in response to determining an absence of a reception of the first message at the first set of resources. In some embodiments, the first message is selected from a number of sequences for the second device, and the first device releases the second set of resources for the second message in response to determining an absence of a reception of one or more of the number of sequences at the first set of resources. In some embodiments, the second message is comprised of a first part and a second part, where a subset of the second set of resources reserved for the first part of the second message are adjacent to the first set of resources reserved for the first message, and where the first device releases the second set of resources for the second message in response to determining an absence of a reception of the first message at the first set of resources and the first part of the second message at the subset of the second set of resources.

In some embodiments, the first device estimates a time offset for reception of the second message, where the time offset is based on the received first message, and transmits, within the time duration gap, a message to the second device, where the message indicates a timing advance value indicative of the timing offset, where the second message is received based on the timing advance value.

In some embodiments, the first device transmits within the time duration gap a message to the second device, where the message indicates a power control value indicative of the power offset. In some embodiments, the first device transmits within the time duration gap a message to the second device, where the message indicates an allocated resource for the second message, where the second message is received based on the allocated resource.

In some embodiments, the first message includes preamble information to identify the second device, and the second message includes payload data. In some embodiments, the first device includes a base station and the second device includes a user equipment.

Figure 10:
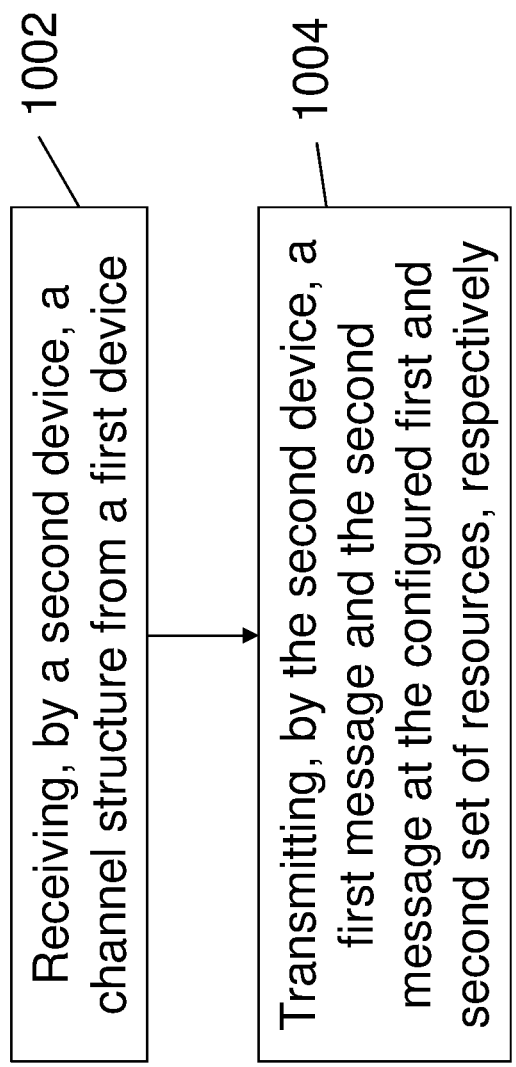
FIG. 10 shows an exemplary flowchart for a communication node to perform transmissions based on a channel structure communicated by the network node.

FIG. 10 shows an exemplary flowchart for a communication node to perform transmissions based on a channel structure communicated by the network node. At the receiving operation 1002, a second device receives a channel structure from a first device, where the channel structure includes a first set of resources reserved for a first message, a second set of resources reserved for a second message, or a time duration gap between the first set of resources and the second set of resources. At the transmitting operation, the second device transmits to the first device the first message and the second message at the configured first and second set of resources, respectively.

In some embodiments, the time duration gap is determined by the first device and where the time duration gap is received by the second device via a broadcast message, a radio resource control (RRC) message or downlink control information (DCI) message. In some embodiments, the time duration gap is calculated based on the configured first and second set of resources.

In some embodiments, the time duration gap is calculated by the second device based on a difference in time domain between a first symbol of the first message and a first symbol of the second message. In some embodiments, the time duration gap is calculated by the second device based on a difference in time domain between a last symbol of the first message and a first symbol of the second message. In some embodiments, the time duration gap is calculated by the second device based on a difference in time domain between a first symbol of the first message and a last symbol of the second message. In some embodiments, the time duration gap is calculated by the second device based on a difference in time domain between a last symbol of the first message and a last symbol of the second message.

In some embodiments, the second device receives from the first device a message within the time duration gap, where the message indicates a timing advance value indicative of a timing offset, where the second device adjusts a timing for transmitting the second message based on the timing advance value. In some embodiments, the second device receives from the first device a message within the time duration gap, where the message indicates a power control value indicative of a power offset, where the second device adjusts a transmission power for transmitting the second message based on the power control value.

In some embodiments, the second device receives from the first device a message by within the time duration gap, where the message indicates an allocated resource for the second message, where the second device transmit the second message on the allocated resource.

In some embodiments, the first message includes preamble information to identify the second device, and the second message includes payload data. In some embodiments, the first device includes a base station and the second device includes a user equipment.

Figure 11:
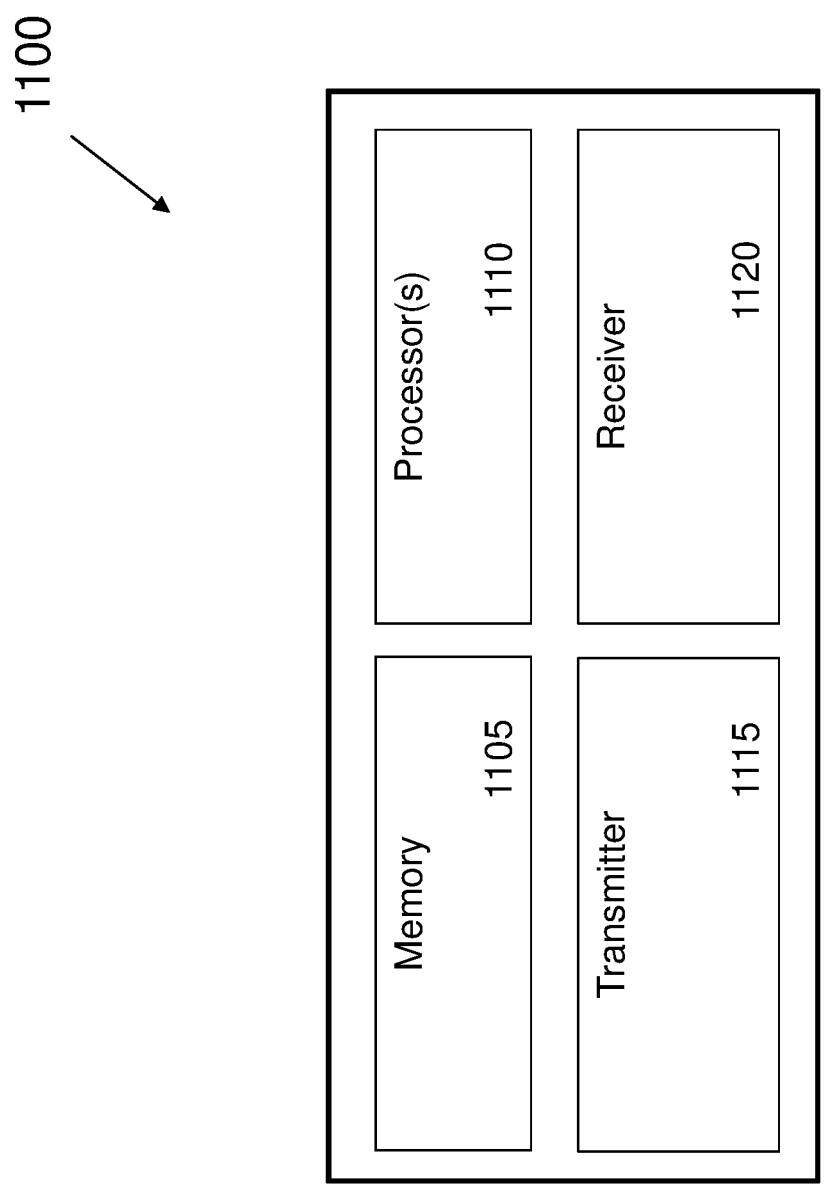
FIG. 11 shows an exemplary block diagram of a hardware platform that may be a part of a network node or a communication node.

FIG. 11 shows an exemplary block diagram of a hardware platform 1100 that may be a part of a network node (e.g., BS) or a communication node (e.g., UE). The hardware platform 1100 includes at least one processor 1110 and a memory 1105 having instructions stored thereupon. The instructions upon execution by the processor 1110 configure the hardware platform 1100 to perform the operations described in FIGS. 1 to 10 and in the various embodiments described in this patent document. The transmitter 1115 transmits or sends information or data to another node. For example, a network node transmitter can communicate a channel structure information to a user equipment. The receiver 1120 receives information or data transmitted or sent by another node. For example, a user equipment can receive the channel structure information from a network node.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:
communicating, by a first device, a channel structure to a second device,
wherein the channel structure includes a first set of resources reserved for a first message, a second set of resources reserved for a second message, or a time duration gap between the first set of resources and the second set of resources, and
wherein the second message is comprised of a first part and a second part,
wherein a subset of the second set of resources reserved for the first part of the second message are adjacent to the first set of resources reserved for the first message, and wherein the first device releases resources corresponding to the second part from the second set of resources in response to determining an absence of a reception of the first message at the first set of resources or the first part of the second message at the subset of the second set of resources.

2. The method of claim 1, wherein the time duration gap is calculated based on the first set of resources and the second set of resources.

3. The method of claim 2, wherein the time duration gap is determined by or is calculated by the first device based on a difference in time domain between a first symbol of the first message and a first symbol of the second message.

4. The method of claim 1, further comprising:
releasing, by the first device, the second set of resources for the second message in response to determining an absence of a reception of the first message at the first set of resources.

5. The method of claim 1,
wherein the first message is selected from a number of sequences for the second device, and
wherein the first device releases the second set of resources for the second message in response to determining an absence of a reception of one or more of the number of sequences at the first set of resources.

6. The method of claim 1, further comprising:
estimating, by the first device, a time offset for reception of the second message, and
transmitting, within the time duration gap, a message to the second device, wherein the message indicates a timing advance value indicative of the time offset.

7. The method of claim 1, further comprising:
transmitting, within the time duration gap, a message to the second device, wherein the message indicates a power control value indicative of a power offset, or
transmitting, within the time duration gap, another message to the second device, wherein the another message indicates an allocated resource for the second message.

8. A wireless communication method, comprising:
receiving, by a second device, a channel structure from a first device,
wherein the channel structure includes a first set of resources reserved for a first message, a second set of resources reserved for a second message, or a time duration gap between the first set of resources and the second set of resources, and
wherein the second message is comprised of a first part and a second part,
wherein a subset of the second set of resources reserved for the first part of the second message are adjacent to the first set of resources reserved for the first message, and
wherein resources corresponding to the second part from the second set of resources is released in response to an absence of a transmission of the first message at the first set of resources or the first part of the second message at the subset of the second set of resources.

9. The method of claim 8, wherein the time duration gap is calculated based on the first set of resources and the second set of resources.

10. The method of claim 9, wherein the time duration gap is calculated by the second device based on a difference in time domain between a first symbol of the first message and a first symbol of the second message.

11. The method of claim 8, further comprising:
receiving a message by the second device within the time duration gap, wherein the message indicates a timing advance value indicative of a time offset, wherein the second device adjusts a timing for transmitting the second message based on the timing advance value.

12. The method of claim 8, further comprising:
receiving a message by the second device within the time duration gap, wherein the message indicates a power control value indicative of a power offset, wherein the second device adjusts a transmission power for transmitting the second message based on the power control value, or
receiving another message by the second device within the time duration gap, wherein the another message indicates an allocated resource for the second message, wherein the second device transmit the second message on the allocated resource.

13. An apparatus for wireless communication comprising a processor, configured to implement a method to:
communicate, by a first device, a channel structure to a second device,
wherein the channel structure includes a first set of resources reserved for a first message, a second set of resources reserved for a second message, or a time duration gap between the first set of resources and the second set of resources, and
wherein the second message is comprised of a first part and a second part,
wherein a subset of the second set of resources reserved for the first part of the second message are adjacent to the first set of resources reserved for the first message, and
wherein the first device releases resources corresponding to the second part from the second set of resources in response to determining an absence of a reception of the first message at the first set of resources or the first part of the second message at the subset of the second set of resources.

14. The apparatus of claim 13, wherein the time duration gap is calculated based on the first set of resources and the second set of resources.

15. The apparatus of claim 14, wherein the time duration gap is determined by or is calculated by the first device based on a difference in time domain between a first symbol of the first message and a first symbol of the second message.

16. The apparatus of claim 13, wherein the processor is further configured to:
release, by the first device, the second set of resources for the second message in response to a determination of an absence of a reception of the first message at the first set of resources.

17. The apparatus of claim 13, wherein the processor is further configured to:
estimate, by the first device, a time offset for reception of the second message, and
transmit, within the time duration gap, a message to the second device, wherein the message indicates a timing advance value indicative of the time offset.

18. An apparatus for wireless communication comprising a processor, configured to implement a method to:
receive, by a second device, a channel structure from a first device,
wherein the channel structure includes a first set of resources reserved for a first message, a second set of resources reserved for a second message, or a time duration gap between the first set of resources and the second set of resources, and wherein the second message is comprised of a first part and a second part, wherein a subset of the second set of resources reserved for the first part of the second message are adjacent to the first set of resources reserved for the first message, and wherein resources corresponding to the second part from the second set of resources is released in response to an absence of a transmission of the first message at the first set of resources or the first part of the second message at the subset of the second set of resources.

19. The apparatus of claim 18, wherein the time duration gap is calculated based on the first set of resources and the second set of resources.

20. The apparatus of claim 19, wherein the time duration gap is calculated by the second device based on a difference in time domain between a first symbol of the first message and a first symbol of the second message.

\* \* \* \* \*